(12) United States Patent
Saride

(10) Patent No.: US 11,356,371 B2
(45) Date of Patent: Jun. 7, 2022

(54) ROUTING AGENTS WITH SHARED MAXIMUM RATE LIMITS

(71) Applicant: T-Mobile USA, Inc., Bellevue, WA (US)

(72) Inventor: Prannoy Kiran Saride, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/949,873

(22) Filed: Nov. 18, 2020

(65) Prior Publication Data

US 2022/0094740 A1 Mar. 24, 2022

Related U.S. Application Data

(60) Provisional application No. 63/080,420, filed on Sep. 18, 2020.

(51) Int. Cl.
| | | |
|---|---|---|
| *H04L 47/125* | (2022.01) | |
| *H04L 67/101* | (2022.01) | |
| *H04L 67/63* | (2022.01) | |
| *H04L 43/16* | (2022.01) | |
| *H04L 43/0882* | (2022.01) | |
| *H04L 67/1008* | (2022.01) | |

(52) U.S. Cl.
CPC ........ *H04L 47/125* (2013.01); *H04L 43/0882* (2013.01); *H04L 43/16* (2013.01); *H04L 67/101* (2013.01); *H04L 67/1008* (2013.01); *H04L 67/327* (2013.01)

(58) Field of Classification Search
CPC ... H04L 47/125; H04L 67/1008; H04L 43/16; H04L 43/0882; H04L 67/101; H04L 67/327

See application file for complete search history.

(56) References Cited

U.S. PATENT DOCUMENTS

| | | | | |
|---|---|---|---|---|
| 5,850,517 A | * | 12/1998 | Verkier | .................. H04L 29/06 709/202 |
| 7,600,229 B1 | * | 10/2009 | Shmuylovich | .......... G06F 9/505 718/104 |
| 7,882,501 B1 | * | 2/2011 | Carlson | ............... G06F 9/44521 717/167 |
| 8,413,160 B2 | * | 4/2013 | Armes | .................... G06F 9/505 718/105 |
| 9,979,674 B1 | * | 5/2018 | Kumar | ............. H04L 29/08243 |
| 10,078,843 B2 | * | 9/2018 | Dadia | ..................... G06F 16/26 |

(Continued)

OTHER PUBLICATIONS

Keshvadi, Sina; "A Multi-Agent based Load balancing System in IaaS Cloud Environment"; International Journal of Robotics and Automation 01(01) DOI:10.15406/iratj.2016.01.00002; Nov. 2016 (Year: 2016).*

*Primary Examiner* — Jerry B Dennison
(74) *Attorney, Agent, or Firm* — Lee & Hayes, P.C.

(57) ABSTRACT

A system including multiple routing agents associated with a server. The routing agents may be configured to share current load data associated with the server. In some cases, the routing agents may also maintain a global maximum rate limit associated with each server of network resource. The global maximum rate limit may be shared between the routing agents to allow the routing agents may provide improve load balancing and prevent overload events on the server during traffic bursts.

15 Claims, 5 Drawing Sheets

(56) References Cited

U.S. PATENT DOCUMENTS

| | | | | |
|---|---|---|---|---|
| 10,104,167 B2* | 10/2018 | Pacella | .................. | H04L 69/16 |
| 10,735,250 B2* | 8/2020 | Liu | ..................... | H04L 61/2007 |
| 2004/0098499 A1* | 5/2004 | Tamai | ................. | H04L 67/1014 |
| | | | | 709/232 |
| 2006/0224725 A1* | 10/2006 | Bali | .................. | H04L 67/1002 |
| | | | | 709/224 |
| 2011/0083179 A1* | 4/2011 | Lawson | ............. | H04L 63/0209 |
| | | | | 726/22 |
| 2011/0161980 A1* | 6/2011 | English | ................. | H04L 43/08 |
| | | | | 718/105 |
| 2011/0252127 A1* | 10/2011 | Iyengar | ................ | G06F 9/5033 |
| | | | | 709/224 |
| 2011/0314119 A1* | 12/2011 | Kakadia | ............. | H04L 67/1002 |
| | | | | 709/213 |
| 2013/0151683 A1* | 6/2013 | Jain | ...................... | G06F 3/0646 |
| | | | | 709/223 |
| 2014/0369204 A1* | 12/2014 | Anand | ................ | H04L 47/125 |
| | | | | 370/235.1 |
| 2017/0279875 A1* | 9/2017 | Gupta | .................... | H04L 67/10 |
| 2018/0270302 A1* | 9/2018 | Yang | ................. | H04L 67/1004 |

\* cited by examiner

ROUTING AGENTS WITH SHARED MAXIMUM RATE LIMITS

CROSS-REFERENCE TO RELATED APPLICATION(S)

This application is a continuation of and claims priority to U.S. Provisional Application Nos. 63/080,420 filed on Sep. 18, 2020 and entitled "ROUTING AGENTS WITH SHARED MAXIMUM RATE LIMITS," which is incorporated herein by reference in its entirety.

BACKGROUND

Today, many networks rely on multiple routing agents to load balance incoming traffic to one or more system servers. In many cases, each of the multiple routing agents attempts to limit the traffic to the server and prevent overload situations based on a maximum configured rate limit for the selected application or server. However, the traffic throttling or limiting by a routing agent is performed independently of the other routing agents servicing the same server system, which may still result in occurrences of overload events during traffic burst situations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
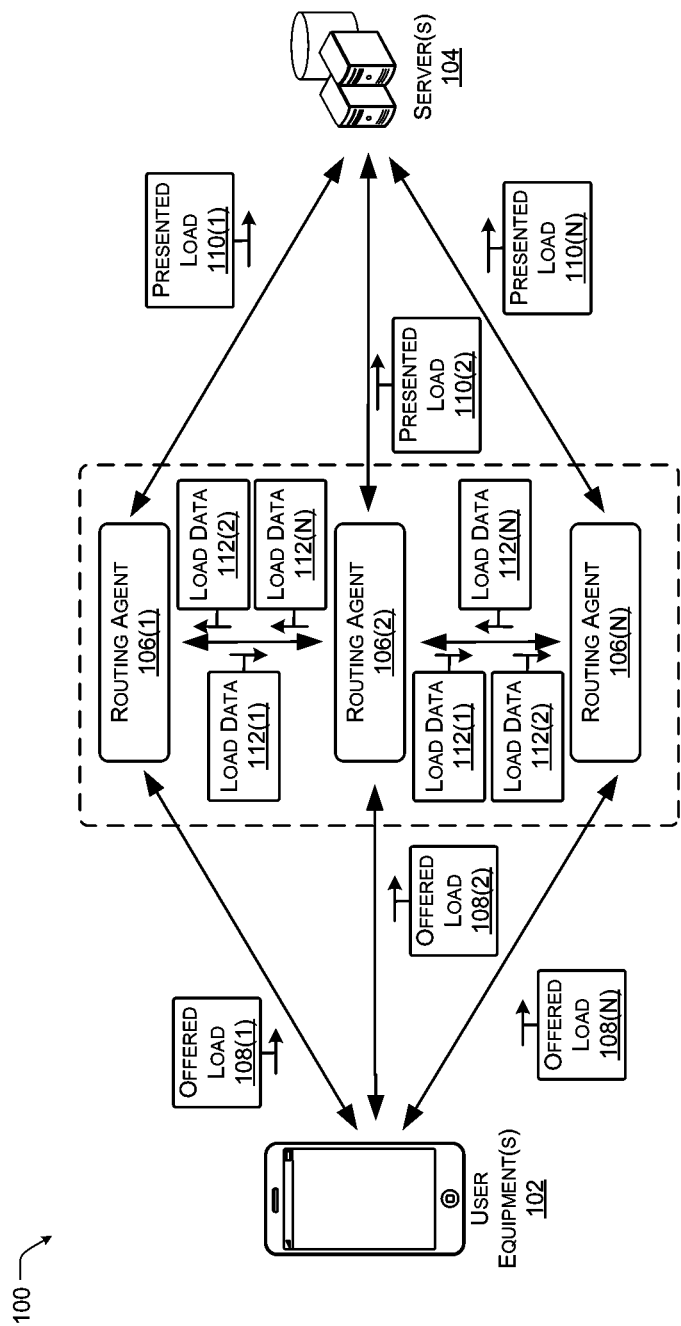
FIG. 1 is an example of a system for routing client-server transactions within a network, in accordance with some examples of the present disclosure.

Discussed herein are systems and methods associated with sets of routing agents associated with a server that are configured to share or cross communicate current traffic loads. Each of the routing agents in the set may then limit the transactions or load being provided to the server based on a shared maximum rate limit associated with the server. For instance, the routing agents may be configured based on a Diameter Overload Information Conveyance (DOIC) protocol. However, in the current example, the maximum rate limit may be shared between each of the routing agents of the set of routing agents servicing a particular server. In this manner, the system, discussed herein, may prevent overloads of the server even during traffic burst situations.

For example, in conventional DOIC systems, each routing agent may include a configurable maximum rate limit threshold for each associated server. However, each routing agent is unaware of the other routing agents also servicing the associated servers. Thus, in the conventional DOIC system if the individual maximum rate limit threshold for an associated server is set to the maximum rate limit of the server, in traffic burst situations its possible for each routing agent to provide the transaction to the server at the maximum rate limit. However, this causes an overload event at the server as multiple routing agents may each send transactions at the maximum rate limit as each routing agent acts independently of the others. In some cases, the conventional DOIC systems may set the individual maximum rate limit threshold for an associated server at a rate below the server's threshold. However, in normal operation, this often causes the server to operate at below optimal capabilities (e.g., the routing agents may reject transactions that the server is capable of processing).

The system discussed herein overcomes both of the limitations of the conventional system by allowing the maximum rate limit threshold of the routing agents to be set at the maximum rate limit of each individual server but while still preventing overloads to the server during traffic burst situations. For example, by sharing the current load (e.g., transactions per second) between each routing agent associated with a server, each individual routing agent may adjust their individual maximum rate limit threshold in substantially real time to prevent an overload event on the server. For example, the maximum rate limit thresholds may be set based on a maximum number of transactions per second and adjusted based on, for instance, a sliding window of time.

For example, each of the DOIC routing agents may be configured to update their corresponding individual maximum rate limit threshold on a periodic basis (such as every millisecond, every 500 milliseconds, every second, every 5 seconds, and the like). In other cases, the routing agents may update the individual maximum rate limit threshold based on triggers, such as incoming transactions exceeding a first trigger threshold, the incoming transactions reducing below a second trigger threshold, a total number of transactions exceeding a third trigger threshold, another routing agent updating the individual maximum rate limit threshold, a signal from a client device, a signal from the associated server, a signal from a system operator, and the like.

The DOIC routing agents may also share the current load or transactions per second being provided to the server prior to updating the corresponding individual maximum rate limit threshold. As such, each DOIC routing agent may determine the individual maximum rate limit threshold based on the current load of the agent as well as the current load of the other routing agents within the set servicing the server. In some implementations, the percentage or amount of the maximum available load of a particular server may be distributed evenly across the DOIC routing agents when maximum available load is approached (e.g., within a predetermined percentage, such as 90% or 95%) and/or when the maximum available load is exceeded. In other implementations, one or more of the DOIC routing agents associated with a server may be given priority or a high percentage of the maximum available load when the maximum available load is approached and/or when the maximum available load is exceeded. For example, a routing agent associated with a particular client may be given priority over other routing agents that service other clients, such as when the particular client is a preferred client or otherwise requires priority (e.g., the client may be associated with a first responder or emergency personal). For instance, a first DOIC routing agent of the system servicing a first client may be allotted 25% of the server's maximum available load while a second routing agent servicing a second client may only be allotted 10% of the server's maximum available load, as the first client may have priority over the second client.

In some cases, a particular DOIC routing agent may service multiple servers. In these cases, the DOIC routing agent may maintain multiple individual maximum rate limit thresholds. In some cases, a particular DOIC routing agent may be configured to send transactions to a second server when a first server has met or exceeded the first server's maximum available load and/or the individual maximum rate limit threshold of the routing agent associated with the first server. For instance, the routing agent may be configured to provide transactions to the first server based on, for example, a geographic location of the client requesting the transaction. However, if at a particular period of time, the number of transactions being provided to the first server exceeds the individual maximum rate limit threshold, the routing agent may first attempt to update or adjust the individual maximum rate limit threshold associated with the first server based on the current load being provided by the other routing agents associated with the first server. In a situation in which the individual maximum rate limit threshold is still exceeded even after updating based on current loads, the routing agent may provide the transaction originating within the geographic region to another server that has lower usage but is typically associated with another geographic region.

FIG. 1 is an example of a system 100 for routing client-server transactions within a network, in accordance with some examples of the present disclosure. In the illustrated example, one or more user equipment or devices 102 may be associated with a particular server 104 or network resource. For example, in some cases, particular clients of the network may generate a large number of transactions and be assigned to particular network resources, such as server 104. In other examples, the server 104 may be assigned to process transactions originating out of predetermined geographic areas. As such, in this example, the server 104 may receive and process transactions associated with each of the user equipment 102 physically located within the assigned geographic region.

In this example, a set of routing agents 106(1)-(N) may be configured between the user equipment 102 and the server 104 to assist with and distribute system maintenance, security, load balancing, and/or authentication of user equipment 102 on behalf of the server 104. For example, the routing agents 106(1)-(N) may be DOIC routing agents that implement the DOIC standards and protocols. In this example, the routing agents 106(1)-(N) are associated with the server 104 or a specific set of network resources. However, it should be understood that in other implementations, that each of the routing agents 106(1)-(N) may be associated with one or more additional servers or network resourcing groups.

The user equipment 102 generates an offered load 108(1)-(N) which is received by each of the routing agents 106(1)-(N). The offered loads 108 may include various types and numbers of transactions to be performed and/or executed by the server 104. At various times, the size (e.g., number of transactions per second) associated with each offered load 108(1)-(N) may vary and the size of the offered loads 108(1)-(N) may differ from each other. For example, the offered load 108(1) may include 100 transactions per second, the offered load 108(2) may include 200 transactions per second, and the offered load 108(N) may include 50 transactions per second.

Each of the routing agents 106(1)-(N) may receive the corresponding offered load 108(1)-(N) and select at least a portion of the offered load to present or send to the server 104 as the corresponding presented load 110(1)-(N), which will be processed by the server 104. At various times, the offered load 108(1) may differ from the presented load 110(1). For instance, the routing agent 106(1) may reject packets based on security, duplication, and/or to prevent overload events at the server 104.

The server 104 or network resources of the group may be configured with a maximum load or number of transactions per second that the server 104 is able to process at any given time. For example, the server 104 may be configured to process 200 transactions per second as a maximum load before packet drops begins. Similarly, each of the routing agents 106(1)-(N) may include a threshold rate limit associated with the maximum number of transactions per second that may be presented to the server 104 by the corresponding routing agent 106. In some cases, the threshold rate limit of each of the routing agents 106(1)-(N) may be a percentage or portion of the maximum load associated with the server 104.

In some cases, one or more of the routing agents 106(1)-(N) may have a larger threshold rate limit than the other routing agents. For instance, the routing agent 106(1) may service priority user equipment 102, such that 50% of the maximum load of the server 104 (e.g., 100 of the 200 transitions per second) is reserved for the priority user equipment 102 and, as such, the routing agent 106(1) may maintain a threshold rate limit of at least 50% of the maximum load of the server 104. In this example, the other 50% of the maximum load (e.g., the other 100 transactions per second) may be shared between the remaining routing agents 106(2)-(N).

In the illustrated implementations, the threshold rate limits and the offered loads 108(1)-(N) received by each of the routing agents 106(1)-(N) servicing the server 104 may be shared between each of the routing agents 106(1)-(N), as load data 112(1)-(N). In this manner, the threshold rate limits of the routing agents 106(1)-(N) may be adjusted in substantially real-time and in a manner that prevents an overload event at the server 104. For instance, in a first example and at a first specific time, the offered load 108(1) may be 150 transactions per second, the offered load 108(2) may be 100 transactions per second, and the offered load 108(N) may be 50 transactions per second. However, as discussed above, the maximum load of the server 104 is 200 transactions per second. In this first example, if the load data 112 (e.g., current load and threshold rate limits) was not shared between the routing agents 106(1)-(N) and the threshold rate limit was set to half of the maximum load of the server 104, the presented load 110(1) would be 100 transactions, the presented load 110(2) would be 100 transactions, and the presented load 110(N) would be 50 transactions. Thus, the server 104 would receive 250 transactions and 50 over the maximum limit and an overload event would occur at the server 104. However, as discussed herein, the load data 112(1)-(N) is shared between the routing agents 106(1)-(N) such that the routing agents may have individual threshold rate limits as well as a shared global maximum threshold rate limit. In this first example using the system discussed herein, each of the routing agents 106(1)-(N) are aware of the total load (e.g., the 300 transactions of the offered loads 108(1)-(N)) and the routing agent 106(1)-(N) processing each transaction. Thus, the routing agent 106(N) may generate a presented load 110(N) of 50 transactions per second, the routing agent 106(2) may limit the presented load 110(2) to 75 transactions per second, and the routing agent 106(1) may also limit the presented load 110(1) to 75 transactions per second. Thus, unlike conventional systems, the system 100, discussed herein, allows the routing agents 106 to limit the total number of transactions per second to 200 (e.g., the server's 104 maximum limit) and the server 104 avoids the overflow event.

In a second example, as discussed above, the routing agent 106(1) may service priority clients and have priority to 50% of the maximum load of the server 104. In this second example, the routing agent 106(1) may send a presented load 110(1) of 100 transactions per second but as the routing agents 106(2) and 106(N) are aware of the load data 112(1)-(N) and the priority of the routing agent 106(1), the routing agents 106(2) and 106(N) may each generate a presented load 110(2) and 110(N), respectively, that includes 50 transactions per second. In a third example, the routing agents 106(2) and 106(N) may also provide a weighted rate limit based on a size of the offered loads 108(2) and 108(N). In this third example, the routing agents 106(2), having a larger offered load 108(2) (e.g., 100 transactions per second), may generate a larger presented load 110(2) than the presented load 110(N) of the routing agent 106(N). For instance, the routing agent 106(2) may generate a presented load 110(2) of 75 transactions and the routing agent 106(N) may generate a presented load 110(N) of 25 transactions (e.g., both routing agents 106(2) and 106(N) reduced the offered loads 108(2) and 108(N) by 25 transactions).

It should also be understood that the size of the presented loads 110(1)-(N) may fluctuate over time. For instance, in a fourth example at a second specific time, the offered load 108(1) may be 50 transactions per second, the offered load 108(2) may be 100 transactions per second, and the offered load 108(N) may be 100 transactions per second. In this example, using the shared load data 112(1)-(N) (e.g., the priority data, offered load data, rate limits, maximum load data, and the like), the routing agent 106(1) may generate a presented load 110(1) of 50 transactions, the routing agent 106(2) may generate a presented load 110(2) of 75 transactions, and the routing agent 106(N) may generate a presented load 110(N) of 75 transactions. In this fourth example, even if the routing agent 106(1) does have priority or access to 50% of the maximum load of the server 104, the routing agent 106(1) may share the transactions with the other routing agents 106(2)-(N) when the routing agent 106(1) is not utilizing the full capacity of its priority threshold rate limit.

Figure 2:
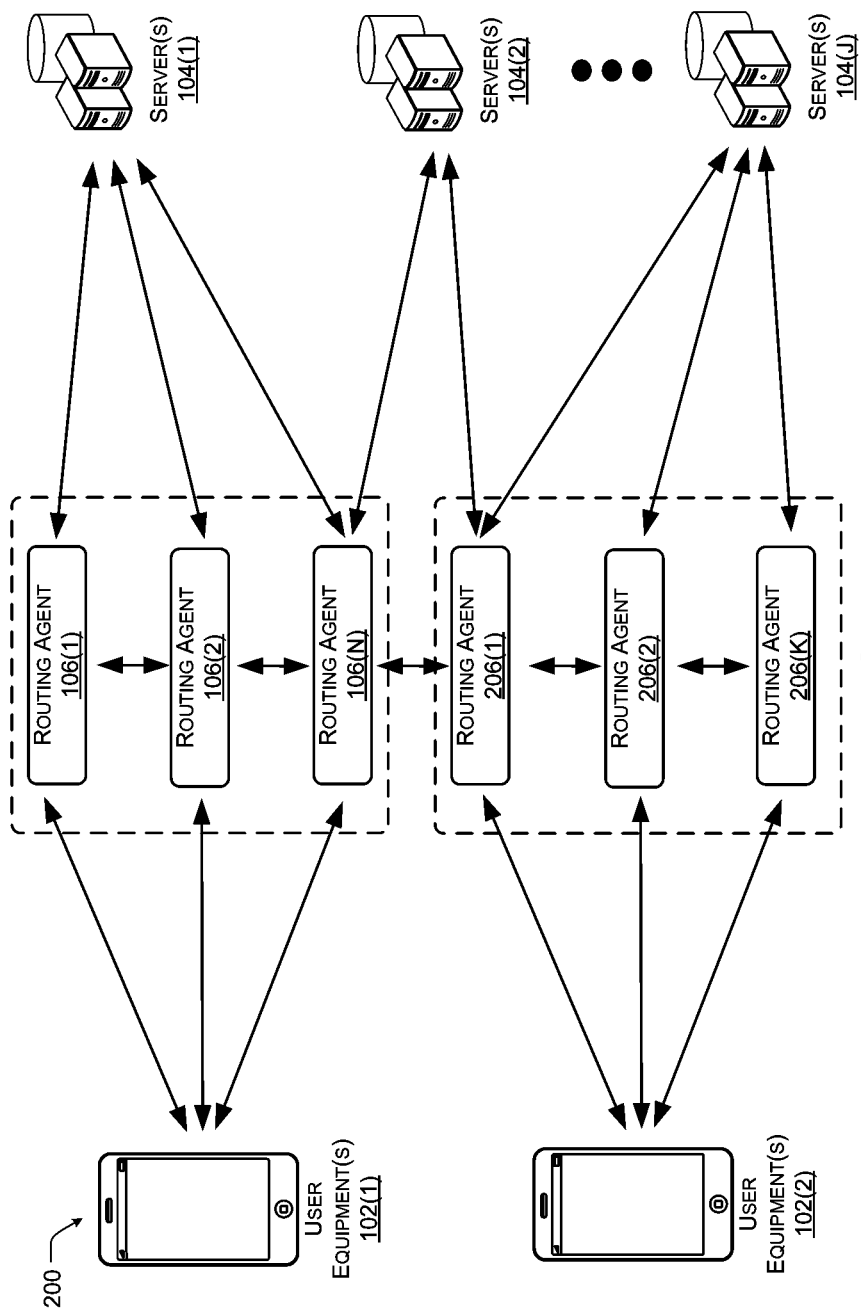
FIG. 2 is another example of a system for routing client-server transactions within a network, in accordance with some examples of the present disclosure.

FIG. 2 is another example of a system 200 for routing client-server transactions within a network, in accordance with some examples of the present disclosure. In the current example, multiple servers 104(1)-(J) or sets of network resources are shown. For instance, each server 104(1)-(J) may be assigned to process transactions originating from user equipment 102 within assigned geographic regions. In this example, routing agents 106(1)-(N) may be configured to service the server 104(1) and the routing agents 206(1)-(K) may be configured to service the server 104(J). In addition, in the current example, the routing agents 106(N) and 206(1) may also be configured to service the server 104(2).

Similar, to the examples of FIG. 1 discussed above, the routing agents 106(1)-(N) servicing the server 104(1) may share load data with each other. For example, the routing agents 106(1)-(N) may share a maximum load of the server 104(1), offered loads received from the user equipment 102(1), any priority data, as well as the current load each routing agent 106(1)-(N) is presenting to the server 104(1). Again, by sharing the load data and having a shared global maximum rate limit, the routing agents 106(1)-(N) may prevent an overload event at the server 104(1) and provide a more efficient usage of the resources of the server 104(1). In the same manner, the routing agents 206(1)-(K) may share load data with each other. For example, the routing agents 206(1)-(K) may also share a maximum load of the server 104(J), offered loads received from the user equipment 102(2), any priority data, as well as the current load each routing agent 206(1)-(K) is presenting to the server 104(J). Once again, by sharing the load data and having a shared global maximum rate limit, the routing agents 206(1)-(K) may prevent an overload event at the server 104(J) and provide a more efficient usage of the resources of the server 104(J).

In the illustrated example, the routing agents 106(N) and 206(1) may also share load data with each other. In the set of routing agents represented by routing agents 106(N) and 206(1) may also share the maximum load of the server 104(2), offered loads received from the user equipment 102(2), any priority data, as well as the current load each routing agent 106(N) and 206(1) is presenting to the server 104(2). In this case, in the event that the routing agents 106(1)-(N) receive offer loads totaling more than the maximum limit of the server 104(1) at any given time, the routing agent 106(1) may send a portion of the transactions associated with the server 104(1) to the server 104(2). In this case, the routing agent 106(N) may determine a first threshold rate limit for the server 104(1) using the shared load data between routing agents 106(1)-(N) and a second threshold rate limit for the server 104(2) using the shared load data from the routing agent 206(1). Thus, the system 200 may allow for more efficient routing of transactions when one geographic region is experiencing a traffic burst but other geographic regions are experiencing normal or expected operations.

In the current example, the load data between the routing agent 106(N) and the routing agent 206(1) may also be shared as part of the load data shared between the routing agents 106(1)-(N). For instance, the routing agent 106(N) may share the load data received from the routing agent 206(1) with the routing agents 106(1) and 106(2). In this manner, each routing agent may determine a presented load for a specific server based on all transactions being processed by each routing agent servicing the specific server.

Figure 3:
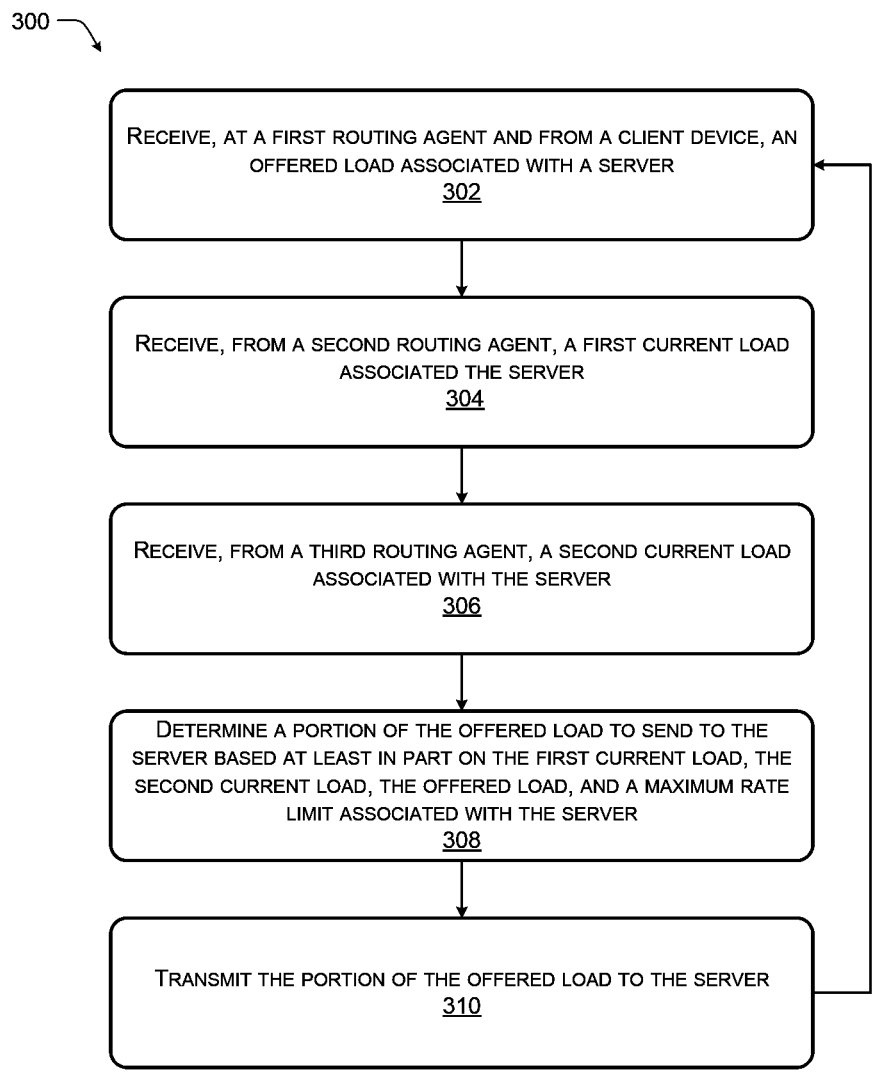
FIG. 3 illustrates an example flow diagram showing an illustrative process associated with determining a load at a routing agent to present to a server or set of network resources, in accordance with some examples of the present disclosure.
Figure 4:
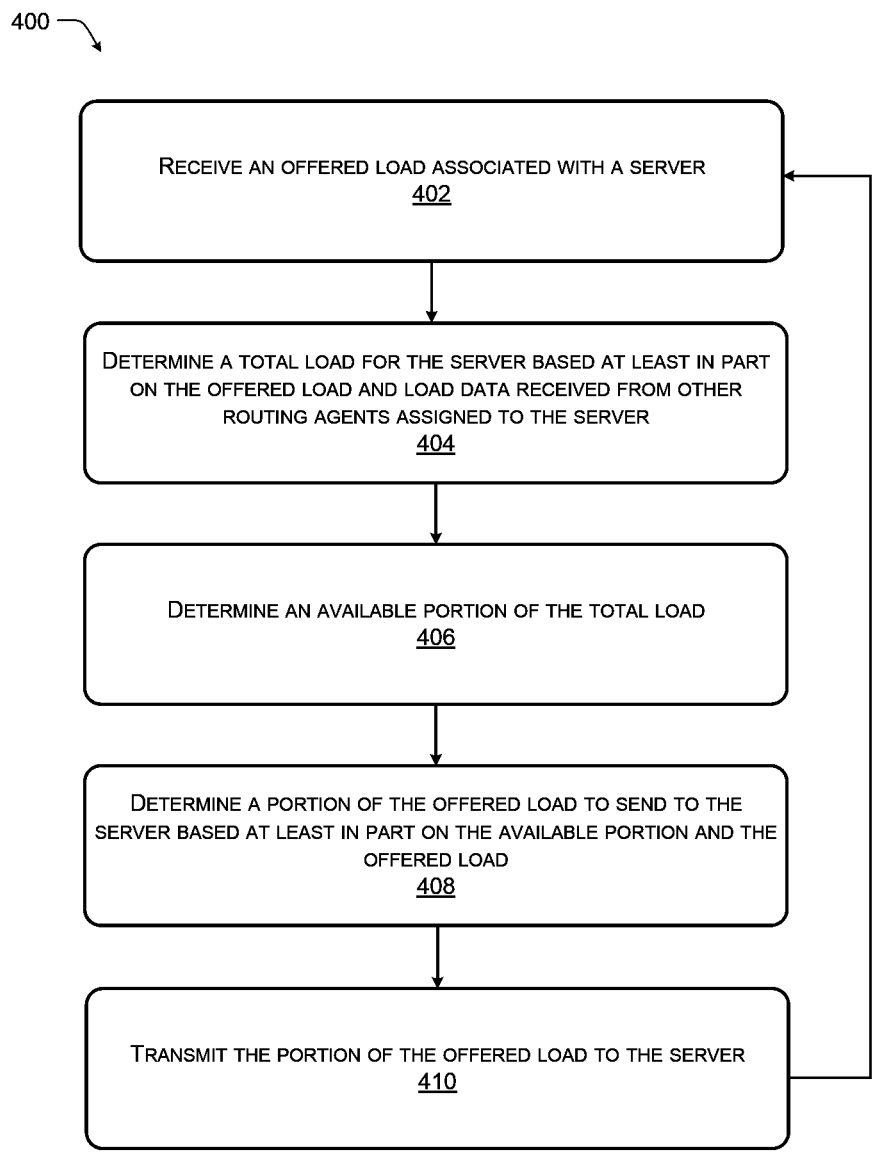
FIG. 4 illustrates another example flow diagram showing an illustrative process associated with determining a load at a routing agent to present to a server or set of network resources, in accordance with some examples of the present disclosure.

FIGS. 3 and 4 are flow diagrams illustrating example processes associated with the routing agents with shared maximum rate limits of FIGS. 1 and 2 according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 illustrates an example flow diagram showing an illustrative process 300 associated with determining a load at a routing agent to present to a server or set of network resources, in accordance with some examples of the present disclosure. As discussed above, the system discussed herein is configured to allow routing agents servicing a network resource or server to share load data, such as a maximum rate limit threshold, current loads, offered loads, and presented loads to the server in a manner to reduce the likelihood of an overload event at any particular resource or server.

At 302, a first routing agent may receive from one or more client devices an offered load associated with a server. The offered load may be for a particular network resource, such as the server associated with the first routing agent. The offered load may be in terms of a first number of transactions per second to be performed by the network resource or server. In some cases the offered load may be associated with a single client device, while in other examples the offered load may be associated with multiple client devices or user equipment (such as user equipment located within a particular region).

At 304, the first routing agent may receive from a second routing agent a first current load associated with the server. The first current load may be an offered load received by the second routing agent for the particular network resource. In other words, both the first current load and the offered load may be associated with the particular processing resource. The first current load may be in terms of a second number of transactions per second to be performed by the particular network resource. In some cases, in addition to the first current load, the first routing agent may also receive a first threshold rate limit associated with the particular network resource and the second routing agent. The first threshold rate limit may be a maximum number of transactions the second routing agent has sent to the particular network resource.

At 306, the first routing agent may receive from a third routing agent a second current load associated with the server. The second current load may be an offered load received by the third routing agent for the particular network resource. In other words, both the second current load, the first current load, and the offered load may be associated with the particular processing resource. The second current load may be in terms of a third number of transactions per second to be performed by the particular network resource. In some cases, in addition to the second current load, the first routing agent may also receive a second threshold rate limit associated with the particular network resource and the third routing agent. The second threshold rate limit may be a maximum number of transactions the third routing agent has sent to the particular network resource.

At 308, the first routing agent determines a portion of the offered load to send or present to the server based at least in part on the first current load, the second current load, the offered load, and a maximum rate limit associated with the server. For example, the first routing agent may determine a total number of transactions associated with the first current load, the second current load, and the offered load. The first routing agent may then determine if the total load exceeds the maximum rate limit associated with the first server. If the total load does not exceed the maximum rate limit, then the first routing agent may select the entire offered load as the portion of the offered load to send to the server.

However, if the total load does exceed the maximum rate limit, the first routing agent may determine a percentage or portion of the maximum rate limit of the server that is available to the first routing agent. For example, the first routing agent may be assigned an equal share of the maximum rate limit as the second routing agent and the third routing agent (e.g., each routing agent has the same priority with respect to the server). In this example, the first routing agent may determine a percentage of the total load represented by the offered load. The first routing agent may then apply the percentage to the offered load, such and the portion of the offered load is equal to the percentage of the offered load.

In another example, the first routing agent may have priority over the other routing agents (e.g., the second routing agent and the third routing agent). For instance, the first routing agent may be entitled to a minimum load (for example, 50% of the maximum rate limit associated with the server). In this instance, the first routing agent may determine if the offered load is greater than or equal to the minimum load. If the offered load is less than the minimum load, then the first routing agent may provide the offered load as the portion of the offered load. However, if the offered load is greater than the minimum load, the first routing agent may send the minimum load as the portion of the offered load.

In yet another example, the second routing agent may have priority over the other routing agents (e.g., the first routing agent and the third routing agent). In the example, the first routing agent may determine if the first current load is greater than or equal to a minimum load associated with the second routing agent. In this instance, if the first current load is greater than or equal to the minimum load of the second routing agent, then the first routing agent may assume the second routing agent is sending the minimum load to the server and determine the portion of the offered load based on the remaining maximum rate limit of the server (e.g., the total load minus the minimum load), the offered load, and the second current load associated with the third routing agent. Likewise, if the first current load is less than the minimum load of the second routing agent, then the first routing agent may assume the second routing agent is sending the first current load to the server and determine the portion of the offered load based on the remaining maximum rate limit of the server (e.g., the total load minus the first current load), the offered load, and the second current load associated with the third routing agent.

It should be understood, that the above examples are representative and that other calculations for the portion of the offered load may be made by the first routing agent. Thus, it should also be understood that each routing agent may have different priorities and the each routing agent is able to determine a portion of the corresponding offered load to send to the server based on the load data (e.g., the current load, priorities, and maximum rate limit of the server) to avoid an overflow event.

At 310, the first routing agent may transmit the portion of the offered load to the server. In some cases, the first routing agent may select particular transactions to include in the portion (e.g., the presented load of FIGS. 1 and 2) based on security concerns, timing, priority, packet data, and the like. Following, transmitting the portion of the offered load to the server, the first agent may return to 302 and determine another or additional portions based on updated load data (e.g., current load data) received from the second routing agent and the third routing agent. In this manner, a threshold rate limit for each routing agent and associated with the server may be adjusted in substantially real time in a manner to improve throughput and load balance on the server as well as to avoid an overflow event during high traffic bursts.

FIG. 4 illustrates another example flow diagram showing an illustrative process 400 associated with determining a load at a routing agent to present to a server or set of network resources, in accordance with some examples of the present disclosure. As discussed above, the system discussed herein is configured to allow routing agents servicing a network resource or server to share load data, such as a maximum rate limit threshold, current loads, offered loads, and presented loads to the server in a manner to reduce the likelihood of an overload event at any particular resource or server.

At 402, a routing agent may receive from one or more client devices an offered load associated with a server. The offered load may be in terms of a number of transactions per second to be performed by the server. In some case the offered load may be associated with a single client device while in other examples the offered load may be associated with multiple client device or user equipment (such as user equipment located within a particular region).

At 404, the routing agent may determine a total load for the server based at least in part on the offered load and load data received from other routing agents assigned to the server. For example, the routing agent may sum the offered load and the load data associated with the other routing agents to determine a total load for the server. It should be understood, that the total load is associated with a particular window of time and that the total load associated with the server may vary over time as the number of transactions received by the routing agent and the other routing agents varies.

At 406, the routing agent may determine an available portion of the total load. The available portion may be associated with the window of time accompanying the offered load. In some cases, the available portion of the total load may be based on a maximum rate limit of the server. The maximum rate limit of the server may be the maximum number of transactions per second the server is capable of processing prior to an overload event. In some cases, the available portion may be the local threshold rate limit for the routing agent during the window of time. (You skipped 408 here)

At 410, the routing agent may transmit the portion of the offered load to the server. In some cases, the routing agent may select particular transactions to include in the portion based on security concerns, timing, priority, packet data, and the like. Following, transmitting the portion of the offered load to the server, the first agent may return to 402 and determine another or additional portions based on updated load data received from the other routing agent for a second window of time. In this manner, a threshold rate limit for each routing agent and associated with the server may be adjusted in substantially real time in a manner to improve throughput and load balance on the server as well as to avoid an overflow event during high traffic bursts.

Figure 5:
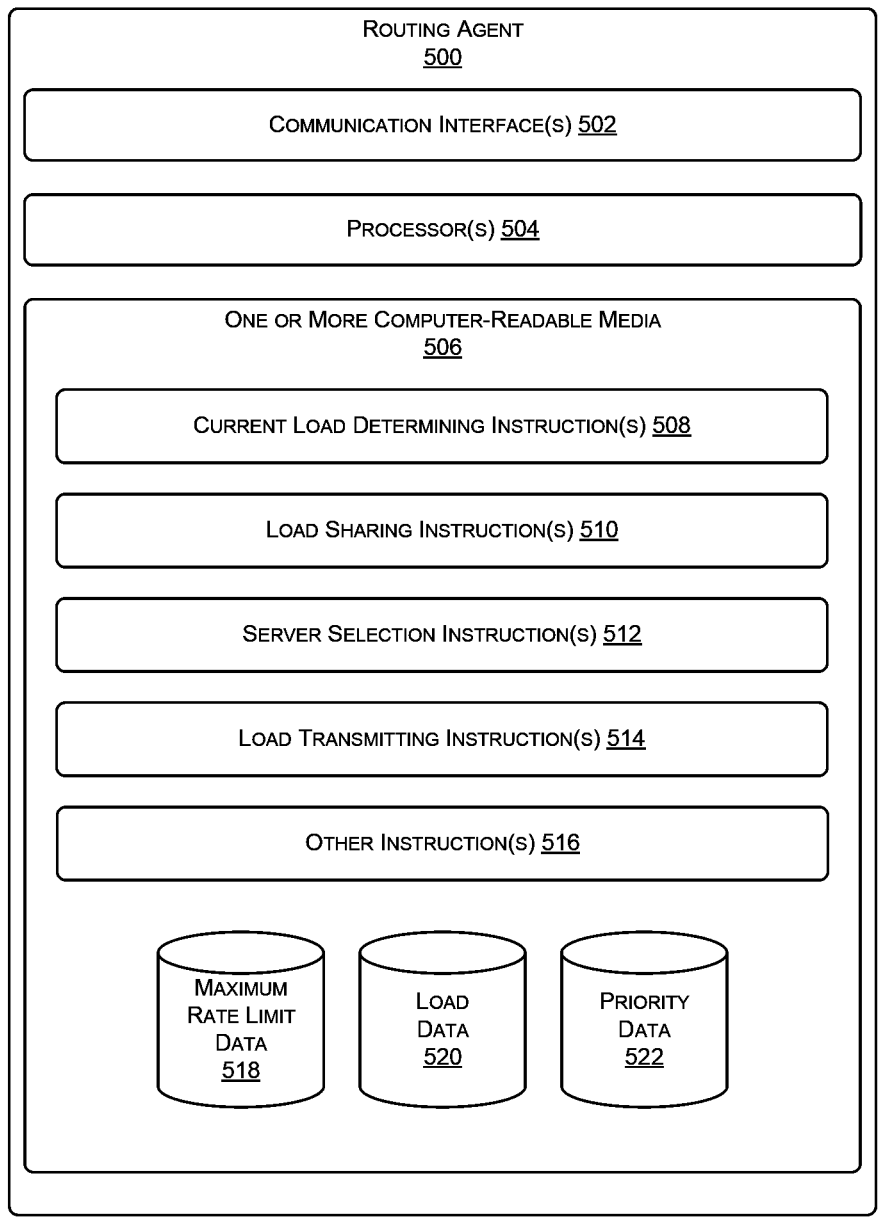
FIG. 5 illustrates an example hardware associated with a routing agent of FIGS. 1-4, in accordance with some examples of the present disclosure.

FIG. 5 illustrates an example hardware associated with a routing agent of FIGS. 1-4, in accordance with some examples of the present disclosure. As discussed above, a routing agent 500 may be one of multiple routing agents configured to present or send loads of client transactions to a server. In the illustrated example, the routing agent 500 may share a global threshold rate limit with the other routing agents also servicing the same server or network resource. The routing agent 500 may also be configured to share current load data with the other routing agents as well as to receive current load data from each of the other routing agents. In this manner, the routing agent 500 may determine a number of transactions, portion of the load, and/or a threshold rate limit associated with the incoming transactions to send or forward to the server.

In some implementations, the routing agent 500 may include one or more communication interfaces 502 configured to facilitate communication between one or more networks, one or more cloud-based systems, and/or one or more devices, such as one or more other routing agents, client devices, user equipment, and/or one or more servers. The communication interfaces 502 may support both wired and wireless connections to various networks, such as cellular networks, radio, WiFi networks, infrared signals, local area networks, wide area networks, the Internet, and so forth. In some cases, the communication interfaces 502 may be configured to receive transactions and/or data packets from user equipment or client devices as well as servers and share load data with other routing agents.

The processor(s) 504 can represent, for example, a central processing unit (CPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. Additionally, each of the processor(s) 504 may possess its own local memory, which also can store program modules, program data, and/or one or more operating systems.

Depending on the exact configuration and type of the routing agent 500, the computer-readable media 506, may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media 506 can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 506 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information. Any such non-transitory computer-readable media can be part of the routing agent 500.

The computer-readable media 506 can include one or more modules and data structures including, for example, current load determining instructions 508, load sharing instructions 510, server selection instructions 512, load transmission instructions 514, as well as other instructions 516, such as an operating system. The one or more modules, instruction sets, and data structures can be in the form of stand-alone applications, productivity applications, an operating system component, or any other application or software module configured to perform operations as described herein. The computer-readable media 506 may also store data, such as maximum rate limit data 518 associated with one or more servers, load data 520 received from one or more other routing agents, and priority data 522 associated with load balancing of the one or more servers services by the routing agent 500.

The current load determining instructions 508 may be configured to determine a portion of the current load of the routing agent 500 to send or present to the server. For example, the current load determining instructions 508 may identify a portion of an offered load or current load to send or present to the server based at least in part on the current load, load data 520 received from other routing agents, and the maximum rate limit data 518 associated with the server at issue. For example, the current load determining instructions 508 may cause the routing agent 500 to determine a total number of transactions associated with the current load of the routing agent 500 and the other routing agents associated with the server. The current load determining instructions 508 may cause the routing agent 500 to determine if the total load exceeds the maximum rate limit associated with the server. If the total load does not exceed the maximum rate limit, then the current load determining instructions 508 may cause the routing agent 500 to select the entire offered load or current load as the portion of the offered load to send to the server.

However, if the total load does exceed the maximum rate limit, the current load determining instructions 508 may cause the routing agent 500 to determine a percentage or portion of the maximum rate limit of the server that is available to the routing agent 500. For example, each routing agent has the same priority with respect to the server. In this example, the current load determining instructions 508 may cause the routing agent 500 to determine a percentage of the total load represented by the offered load of the routing agent 500. The current load determining instructions 508 may cause the routing agent 500 to apply the percentage to the offered load or current load, such and the portion of the offered load is equal to the percentage of the offered load. In other examples, the current load determining instructions 508 may cause the routing agent 500 to determine the portion based on priority data 522, such as reserved portions of the bandwidth of the server for the routing agent 500 and/or other routing agents associated with the server.

The load sharing instructions 510 may be configured to send and receive load data between the routing agents. For example, the load sharing instructions 510 may identify particular routing agents associated with particular servers which should receive the current load data of the routing agent 500. As discussed above, the routing agent 500 may service multiple servers or network resources. The load sharing instructions 510 may be configured to cause the routing agent 500 to determine which other routing agents should receive current load data based on the incoming packets and the availability of the servers.

The server selection instructions 512 may be configured to determine or select a server to receive different transactions of the current load or offered load. For example, the routing agent 500 may be associated with multiple servers and the server selection instructions 512 may be configured to select a server to which each individual data packet is to be sent. In some cases, the server selection instructions 512 may also be configured to reroute packets to different servers when one or more originally designated servers is unavailable or operating at peak capacity.

The load transmission instructions 514 may be configured to present or send the portion of the current load to the designated server. In some cases, the load transmission instructions 514 may select individual transactions or data packets to send to the server based on the portion or amount identified by the load sharing instructions 510 and other criteria, such as security issues, packets duplication, and the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
receiving, at a first routing agent, an offered load from a first client device, the offered load including a first number of transactions for a server, the server associated with the first routing agent;
receiving, at the first routing agent, a first current load from a second routing agent, the first current load including a second number of transactions for the server;
determining a portion of the offered load to provide to the server based at least in part on the first number of transactions, the second number of transactions, and a first shared global maximum rate limit associated with the server;
sending the portion of the offered load to the server;
receiving, at the first routing agent, a second offered load, the second offered load including a third number of transactions for the server, the offered load associated with a first window of time and the second offered load associated with a second window of time;
receiving, at the first routing agent, a second current load from the second routing agent, the second current load including a fourth number of transactions for the server and associated with the second window of time;
determining a portion of the second offered load to provide to the server based at least in part on the third number of transactions, the fourth number of transactions, and the first shared global maximum rate limit associated with the server; and sending the portion of the second offered load to the server during the second window of time.

2. The computer-implemented method as claim 1 recites, further comprising:
receiving, at the first routing agent, a third current load from a third routing agent, the third current load including a fifth number of transactions for the server; and wherein the portion of the offered load is based at least in part on the fifth number of transactions.

3. The computer-implemented method as claim 1 recites, wherein the server is associated with the second routing agent.

4. The computer-implemented method as claim 1 recites, wherein the portion of the second offered load is different than the portion of the offered load.

5. The computer-implemented method as claim 1 recites, wherein the second offered load is received from the first client device.

6. The computer-implemented method as claim 1 recites, further comprising:
receiving, at the first routing agent, a third offered load from the first client device, the third offered load including a first number of transactions for a second server, the second server associated with the first routing agent;
receiving, at the first routing agent, a current load from a third routing agent, the current load from the third routing agent including a second number of transactions for the second server;
determining a portion of the second offered load to provide to the second server based at least in part on the first number of transactions for the second server, the second number of transactions for the second server, and a second shared global maximum rate limit associated with the second server, the second shared global maximum rate limit different than the first shared global maximum rate limit; and
sending the portion of the third offered load to the second server.

7. A routing agent comprising:
one or more communication interfaces;
one or more processors;
non-transitory computer-readable media storing computer-executable instructions, which when executed by the one or more processors cause the one or more processors to perform operations including:
receiving an offered load from a first client device, the offered load including a first number of transactions for a server;
receiving a first current load from a second routing agent, the first current load including a second number of transactions for the server;
determining a portion of the offered load to provide to the server based at least in part on the first number of transactions, the second number of transactions, and a first shared global maximum rate limit associated with the server;
sending the portion of the offered load to the server;
receiving a second offered load, the second offered load including a third number of transactions for the server, the offered load associated with a first window of time and the second offered load associated with a second window of time;
receiving a second current load from the second routing agent, the second current load including a fourth number of transactions for the server and associated with the second window of time;
determining a portion of the second offered load to provide to the server based at least in part on the third number of transactions, the fourth number of transactions, and the first shared global maximum rate limit associated with the server; and
sending the portion of the second offered load to the server during the second window of time.

8. The routing agent as recited in claim 7, wherein the non-transitory computer-readable media stores additional computer-executable instructions, which when executed by the one or more processors cause the one or more processors to perform operations including:
receiving a third current load from a third routing agent, the third current load including a fifth number of transactions for the server; and
wherein the portion of the offered load is based at least in part on the fifth number of transactions.

9. The routing agent as recited in claim 7, wherein the non-transitory computer-readable media stores additional computer-executable instructions, which when executed by the one or more processors cause the one or more processors to perform operations including:
receiving a third offered load from the first client device, the third offered load including a first number of transactions for a second server;
receiving a current load from a third routing agent, the current load from the third routing agent including a second number of transactions for the second server;
determining a portion of the third offered load to provide to the second server based at least in part on the first number of transactions for the second server, the second number of transactions for the second server, and a second shared global maximum rate limit associated with the second server, the second shared global maximum rate limit different than the first shared global maximum rate limit; and
sending the portion of the third offered load to the second server.

10. The routing agent as recited in claim 9, wherein determining the portion of the offered load to provide to the server is based at least in part on a priority status of the second server.

11. The routing agent as recited in claim 7, wherein the first window of time differs from the second window of time.

12. The routing agent as recited in claim 7, wherein the second offered load is received from a second client device, the second client device different than the first client device.

13. A non-transitory computer-readable medium storing computer-executable instructions, which when executed by one or more processors of a first routing agent cause the first routing agent to perform operations comprising:
receiving, at a first routing agent, an offered load from a first client device, the offered load including a first number of transactions for a server, the server associated with the first routing agent;
receiving a first current load from a second routing agent, the first current load including a second number of transactions for the server;
determining a portion of the offered load to provide to the server based at least in part on the first number of transactions, the second number of transactions, and a first shared global maximum rate limit associated with the server;

sending the portion of the offered load to the server;

receiving a second offered load, the second offered load including a third number of transactions for the server, the offered load associated with a first window of time and the second offered load associated with a second window of time;

receiving a second current load from the second routing agent, the second current load including a fourth number of transactions for the server and associated with the second window of time;

determining a portion of the second offered load to provide to the server based at least in part on the third number of transactions, the fourth number of transactions, and the first shared global maximum rate limit associated with the server; and sending the portion of the second offered load to the server during the second window of time.

14. The non-transitory computer-readable medium as claim 13 recites, the operations further comprising:

receiving, at the first routing agent, a third current load from a third routing agent, the third current load including a fifth number of transactions for the server; and wherein the portion of the offered load is based at least in part on the fifth number of transactions.

15. The non-transitory computer-readable medium as claim 13 recites, wherein the first number of transactions differ from the second number of transactions.

* * * * *